United States Patent
Li et al.

(10) Patent No.: US 11,681,463 B2
(45) Date of Patent: *Jun. 20, 2023

(54) OFFLOAD DEFRAG OPERATION FOR HOST-MANAGED STORAGE

(71) Applicant: Intel Corporation, Santa Clara, CA (US)

(72) Inventors: Peng Li, Beaverton, OR (US); Jawad B. Khan, Portland, OR (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/350,574

(22) Filed: Jun. 17, 2021

(65) Prior Publication Data

US 2021/0311659 A1    Oct. 7, 2021

Related U.S. Application Data

(63) Continuation of application No. 16/457,982, filed on Jun. 29, 2019, now Pat. No. 11,042,323.

(51) Int. Cl.
*G06F 3/06* (2006.01)
*G06F 12/1081* (2016.01)
*G06F 12/1009* (2016.01)

(52) U.S. Cl.
CPC ............ *G06F 3/0658* (2013.01); *G06F 3/064* (2013.01); *G06F 3/0613* (2013.01);
(Continued)

(58) Field of Classification Search
CPC ...... G06F 3/0658; G06F 3/0613; G06F 3/064; G06F 3/0679; G06F 12/1081; G06F 12/1009
See application file for complete search history.

(56) References Cited

U.S. PATENT DOCUMENTS 9,208,888 B1   12/2015   Wakchaure et al.
10,078,453 B1   9/2018   Li et al.
(Continued)

FOREIGN PATENT DOCUMENTS

WO   2013147894 A1   10/2013

OTHER PUBLICATIONS

Extended European Search Report for Patent Application No. EP 20 16 4432.5, dated Sep. 4, 2020, 8 pages.
(Continued)

*Primary Examiner* — Ryan Bertram
(74) *Attorney, Agent, or Firm* — Compass IP Law PC

(57) ABSTRACT

A host-managed storage device includes an offload capability that enables the host to offload all or a portion of a defrag operation to the storage device. Rather than issuing read, write or copy operations and commands to relocate data to the host's DRAM, the host assembles a defrag operation command descriptor for the storage device controller. The command descriptor includes a defrag bitmap that can be directly accessed by the storage device controller to conduct the defrag operation entirely on the storage device at band granularity, without consuming host CPU cycles or host memory. The reduction in host operations/commands achieved by offloading defragmentation to the storage device is on the order of at least a thousand-fold reduction.

18 Claims, 11 Drawing Sheets

119 – Example INVALIDITY TABLE

| Example Values: | BAND Index 206 | IU_1st Status | IU_2nd Status | IU_3rd Status | | IU_Last Status |
|---|---|---|---|---|---|---|
| (BAND 1) → | 1 | True | False | False | | True |
| e.g. BAND 3 is most invalid 208 → (BAND 2) → | 2 | False | True | True | 212 | False |
| (BAND 3) → | 3 | False | False | True | ... | False |
| (BAND 4) → | 4 | True | False | False | | True |
| ... | | ... | ... | ... | | ... |
| (BAND X) → | X | True | True | True | | False |

210

(52) U.S. Cl.
CPC ........ *G06F 3/0679* (2013.01); *G06F 12/1081* (2013.01); *G06F 12/1009* (2013.01)

(56) References Cited

U.S. PATENT DOCUMENTS

| | | |
|---|---|---|
| 2007/0094445 A1 | 4/2007 | Trika et al. |
| 2009/0327582 A1* | 12/2009 | Chartrand ........... G06F 12/0246 |
| | | 711/E12.001 |
| 2014/0095767 A1 | 4/2014 | Trika et al. |
| 2015/0039577 A1* | 2/2015 | Talagala ................ G06F 3/0638 |
| | | 707/703 |
| 2018/0089074 A1 | 3/2018 | Li et al. |
| 2018/0173420 A1 | 6/2018 | Li et al. |
| 2019/0004700 A1 | 1/2019 | Oshinsky et al. |
| 2019/0042113 A1 | 2/2019 | Li et al. |
| 2019/0114255 A1 | 4/2019 | Jain |

OTHER PUBLICATIONS

Open-Channel Solid State Drives Specification, Revision 2.0, Jan. 29, 2018, 29 pages.
European First Office Action, (EP Exam Report Article 94(3) EPC), for Patent Application No. 20164432.5, dated Jun. 30, 2022, 10 pages.

\* cited by examiner

115 – Example L2P INDIRECTION TABLE

119 – Example INVALIDITY TABLE

300 – Example DEFRAG OPERATION REQUEST COMMAND DESCRIPTOR assembled by Host and transmitted to SSD)

| DWORD | Byte 3 | Byte 2 | Byte 1 | Byte 0 |
|---|---|---|---|---|
| 0 | 304 — SSD DRAM offset | 306 — Size of this command payload (65540 DWords) | | |
| 1 | 308 — Source band index | 310 — #of target bands | | Reserved |
| 2 | 312 — Target band 1 index | 314 — Target band 2 index (optional) | | |
| 3 | 316 — Target band 1 offset | Reserved | | |
| 4-65539 | 318 — Defrag bitmap (256KiB)* | | | |

*DEFRAG BITMAP SIZE Example:

$$\frac{\text{SSD BAND Physical Capacity (e.g. 8GiB)}}{\text{IU Size (e.g. 4KiB)}} = 256\text{KiB}$$

FIG. 3

OFFLOAD DEFRAG OPERATION FOR HOST-MANAGED STORAGE

RELATED CASES

This application is a continuation of and claims the benefit of U.S. patent application Ser. No. 16/457,982, entitled, "OFFLOAD DEFRAG OPERATION FOR HOST-MANAGED STORAGE", filed Jun. 29, 2019, which is incorporated by reference in its entirety.

TECHNICAL FIELD

Examples described herein are generally related to storage systems for host-managed storage devices.

BACKGROUND

For host-managed storage devices containing non-volatile memory (NVM), such as solid-state drives (SSDs), the memory pages, such as a NAND page, are organized into multiple groups (or bands). The NAND pages within each group/band are typically programmed sequentially. The basic unit of storage at the host level is block addressable using logical block addressing. For example, a logical band of memory may be mapped using logical block addressing by mapping each logical band to a range of logical block addresses (LBAs). In addition, logical bands can be mapped using storage device physical bands by mapping each logical band to physical bands of a storage device directly (e.g., physical sectors). Thus, an LBA can be mapped to a physical NAND page or other type of physical sector of storage.

To manage a storage device efficiently, the host typically maintains a logical-to-physical address (L2P) indirection table to map an LBA to a physical NAND page address. Each entry in the L2P indirection table associates a logical address index with a physical NAND page address that aligns with a unit of contiguous LBAs, referred to as an indirection unit (IU). Each IU contains N contiguous LBAs, where N represents the mapping granularity or IU granularity. A larger N can help reduce the memory footprint of the L2P table. A smaller N can help reduce write amplification under random workloads. Write amplification increases the number of times a physical sector of storage must be erased and rewritten which can have an adverse impact on the lifespan of the SSD.

The host also maintains an invalidity table to track the invalidity of each group/band in terms of IU granularity, i.e., how many IUs in a given group/band contain stale or otherwise invalid data. The host uses the invalidity table to determine when to initiate a defragmentation (defrag) operation to free up NAND space occupied by IUs that contain invalid data and relocate IUs that contain valid data. The host-initiated defrag operation selects the group(s)/band(s) to be defragmented based on which ones have the greatest number of IUs that contain stale/invalid data.

BRIEF DESCRIPTION OF THE DRAWINGS

FIG. 3 illustrates an example command descriptor for the example system.

DETAILED DESCRIPTION

Figure 1:
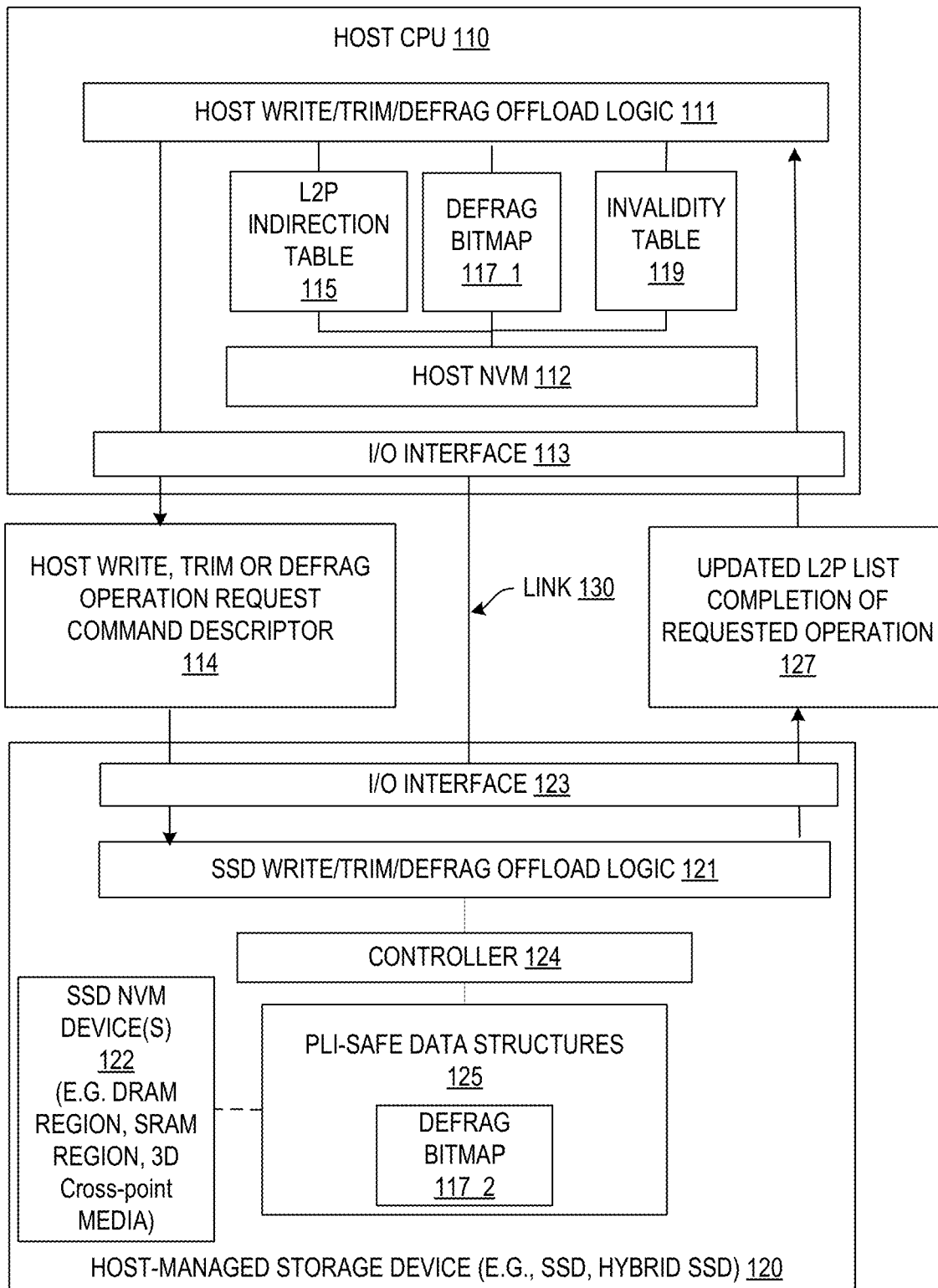
FIG. 1 illustrates an example host and host-managed storage device for the example system.

For host-managed SSDs, such as OC (Open-Channel) NAND SSDs that conform to the Open-Channel SSD Specification, published at openchannelssd.readthedocs.io/en/latest/specification/ the L2P indirection table is managed by the host. Once the defrag operation is triggered, the host uses read and write operations or, without reading the data uses vector-copy or on-SSD-copy commands, to relocate data to the host dynamic random-access memory (DRAM). These operations and commands hurt performance and introduce design complexities.

For example, vector-copy or on-SSD-copy commands can only move a limited number of LBAs per command. According to the Open-Channel SSD Specification, a vector-copy command can only move a maximum of 64 logic chunks, where a chunk is defined as the smallest range of logic blocks that can be reset as a unit. Since each defragment operation can involve millions of LBAs, hundreds of thousands of commands would have to be issued to the SSD to accomplish one defragment operation. Processing hundreds of thousands of commands consumes additional host central processor unit (CPU) capacity which can adversely impact performance, especially if the commands create a bottleneck at the CPU.

As another example, the host software typically maintains a library to manage defragment operations for a host-managed storage device that entails reading a band journal to accelerate the defragment operations, using the L2P indirection table to check the validity of data, and issuing hundreds of thousands of vector-copy commands to relocate valid data. Each module of host software increases the design complexity of the host-managed storage device for implementation and debugging. Additionally, each module of host software consumes additional host CPU cycles and DRAM capacity. For example, reading a band journal from a storage device into the host's DRAM consumes additional DRAM. Comparing the band journal information with information from L2P indirection table lookups consumes additional CPU cycles.

To address the foregoing problems posed by defragmentation, a host-managed storage device includes an offload capability that enables the host to offload all or a portion of a defragment ("defrag") operation to the storage device. In one embodiment, a defrag operation is conducted entirely on a storage device, such as an SSD, including determining the valid sectors/blocks to relocate without requiring data transfers from/to the host. In one embodiment, a defrag operation is specified by the host and conducted by the storage device at the group/band level, resulting in significantly lower number of command-transfers compared to previous approaches. Throughout the description that follows a group/band, hereafter referred to simply as a band, is one or more physical sectors of storage in a storage device. In one embodiment, the host can include an accelerator to improve the operation of the host-managed storage device, including a graphics machine learning processor and the like.

In one embodiment, rather than issuing read, write or copy operations and commands to relocate data to the host's DRAM, the host assembles a defrag operation command descriptor to send to the storage device controller. The command descriptor specifies a defrag bitmap that can be directly accessed by the storage device controller to conduct the defrag operation entirely on the storage device at band granularity, without consuming host CPU cycles or host memory.

In one embodiment, the defrag bitmap is an easy-to-reconstruct bitmap data structure that can be used to optimize the defrag operation. For example, in a typical embodiment, offloading the defrag operation to the storage device reduces, on the order of at least a thousand-fold, the number of operations/commands performed by the host. Among other advantages, the defrag bitmap eliminates the need for band-journal reads and L2P indirection table comparisons to check the validity of data for breaking down the defrag operations. In one embodiment, the storage device controller can maintain the defrag bitmap in the storage device itself and conduct the defrag operation when commanded to by the host.

In one embodiment, the defrag bitmap stores a single bit per IU-aligned physical address to track the status of each IU in a given band, i.e., to track whether an IU in a given band contains invalid, or stale, data. In a typical embodiment, the bitmap memory footprint is only 0.0031% of an SSD's capacity. Because the footprint of the defrag bitmap is small, it can be safely stored in a power-loss-interrupt (PLI) safe region of an SSD, such as a DRAM or SRAM region of an SSD that is backed up by PLI energy.

Alternatively, or in addition, the defrag bitmap is small enough to be safely stored as part of the fast context data structure on the host, for example along with the L2P indirection table and invalidity table data structures managed by the host. Since the defrag bitmap size is typically only a small percentage of the L2P indirection table size (as determined by the ratio of the maximum band physical capacity to the size of an IU) it can be implemented as part of the fast context, which mainly applies to the L2P indirection table in a host-managed device. In this manner the existing context save/restore algorithms can support the replay in case of an unanticipated power loss. During initialization, the defrag bitmap can be loaded in the host DRAM. The host will update this bitmap after each host write/trim/defrag operation.

Because there are also cost overheads for capacitors and higher-processor requirements associated with the SSD algorithms, especially related to L2P management, indirection, defragmentation and power-loss recovery (PLR), the host requires significant processor resources. Offloading all or a part of the defragment operation from the host to the storage device reduces the amount of resources required by the host.

FIG. 1 illustrates an example defrag offload system 100 for a host-managed storage device. In some examples, as shown in FIG. 1, system 100 includes a host CPU 110 coupled to a host-managed storage device 120 through input/output (I/O) interface 113 and I/O interface 123 over link 130. The host-managed storage device 120 can include an SSD or a hybrid SSD, or any other NVM-based storage device supporting logical block addressing that requires indirection and defragmentation to perform efficiently. In some examples, memory or storage device 120 may include, but is not limited to, a dual in-line memory module (DIMM).

In one embodiment, the NVM-based storage device 120 can comprise of different types of NVM storage 122, including a smaller and faster access primary memory storage and a secondary memory included in a hybrid SSD. NVM storage 122 is a memory whose state is determinate even if power is interrupted to the device. In one embodiment, the NVM device 120 can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device 120 can also include a byte-addressable write-in-place three-dimensional ("3D") cross-point ("XP") memory device, or other byte addressable write-in-place NVM devices (also referred to as persistent memory), such as single or multi-level Phase Change Memory (PCM) or phase change memory with a switch (PCMS), NVM devices that use chalcogenide material (e.g., a chalcogenide phase change material), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. A secondary NVM storage 122 can be comprised of block addressable NVM that includes dies (e.g., single level cell (SLC), multi-level cell (MLC), triple level cell (TLC) NAND memories, etc.). Other NVM storage 122 may also be used.

Also, as shown in FIG. 1, host CPU 110 may be arranged to execute logic 111 for a host write or host trim operation, as well as the defrag operation. Logic 111 can be configured to interact with an L2P indirection table 115, invalidity table 119 and defrag bitmap 117_1 data structures in a host NVM 112. The host NVM 112 in which the data structures are maintained can include a region of NVM that is configured for fast context switching should the defrag operation and offloading of the defrag operation be interrupted, e.g., due to a power loss. The fast context switching can make use of the existing context save/restore algorithms implemented in the host to support replay in case of an unanticipated power loss. In one embodiment, the host 110 updates the defrag bitmap after each host write, host trim and host defrag operation of logic 111.

In one embodiment, the host CPU 110 assembles a host write, trim or defrag operation request in the form of a vendor-unique command descriptor 114. The command descriptor 114 is received and processed by controller 124. Controller 124 performs the requested command or operation using the SSD write/trim/defrag offload logic 121. In one embodiment, the command descriptor 114 enables the controller 124 to access the defrag bitmap 117_1 as the defrag bitmap 117_2 stored in a PLI-safe data structure 125 to provide further support in case of an unanticipated power loss. During the performance of the host write, host trim and host defrag operations of logic 121, the controller 124 generates an updated L2P list 127 and corresponding completion notification that is relayed back to the host CPU 110 upon the SSD controller's 124 completion of the requested operation 114.

According to some examples, I/O interface 113, I/O interface 123 and link 130 may be arranged to operate according to one or more communication protocols and/or memory or storage access technologies. For examples, I/O interface 113, link 130 and I/O interface 123 may be arranged to use communication protocols according to the Peripheral Component Interconnect (PCI) Express Base Specification, revision 3.1a, published in December 2015 ("PCI Express specification" or "PCIe specification") or according to one or more Ethernet standards promulgated by the Institute of Electrical and Electronics Engineers (IEEE) such as but not limited to IEEE 802.3-2012, Carrier sense Multiple access with Collision Detection (CSMA/CD) Access Method and Physical Layer Specifications, Published in December 2012 (hereinafter "IEEE 802.3 specification"). I/O interface 113, link 130 and I/O interface 123 may also be arranged to use memory or storage access technologies to include, but not limited to, the Non-Volatile Memory Express (NVMe) Specification, revision 1.2a, published in October 2015 ("NVMe specification") or the Serial Attached SCSI (SAS) Specification, revision 3.0, published in November 2013 ("SAS-3 specification"). Also protocol extensions such as, but not limited to, NVMe over Fibre Channel ("NVMf"), the simple storage service ("S3"), Swift or Kinetic protocol extensions may be used to relay host write/trim commands and defrag operation requests 114 from components of host CPU 110 to components of memory or storage device 120.

In some examples, host CPU 110 may be part of a host computing platform that may include, but is not limited to, a server, a server array or server farm, a web server, a network server, an Internet server, a work station, a minicomputer, a main frame computer, a supercomputer, a network appliance, a web appliance, a distributed computing system, multiprocessor systems, processor-based systems, or combination thereof.

In some examples, host CPU 110 may include various commercially available processors, including without limitation an AMD® Athlon®, Duron® and Opteron® processors; NVIDIA® Tegra® processors, ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon® or Xeon Phi® processors; and similar processors.

According to some examples, NVM device(s) 122 at memory or storage device 120 may be composed of one or more memory devices or dies which may include various types of non-volatile memory. The various types of non-volatile memory may include, but are not limited to, non-volatile types of memory such as 3DXP memory that may be byte or block addressable. These byte or block addressable non-volatile types of memory may include, but are not limited to, memory that uses 3DXP memory that uses chalcogenide material (e.g., chalcogenide phase change material), multi-threshold level NAND flash memory, NOR flash memory, single or multi-level phase change memory (PCM), resistive memory, nanowire memory, ferroelectric transistor random access memory (FeTRAM), silicon-oxide-nitride-oxide-silicon (SONOS) memory, magnetoresistive random access memory (MRAM) memory that incorporates memristor technology, or spin transfer torque MRAM (STT-MRAM), or a combination of any of the above, or other non-volatile memory types.

Figures 2A, 2B:
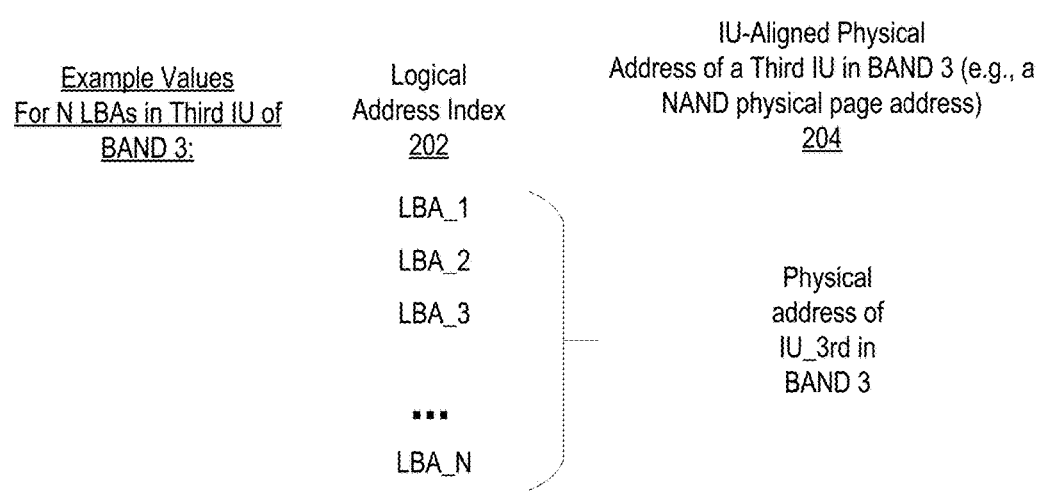
FIGS. 2A-2D illustrate an example indirection and invalidity table, a bitmap and a list for the example system.

FIGS. 2A-2D illustrate an example L2P indirection table 115, an invalidity table 119, a defrag bitmap 117_1/117_2 and an L2P list 127, all of which are data structures employed in accordance with embodiments of the defrag offload system 100 described in FIG. 1. The example values in FIGS. 2A-2D follow an example of a third IU_$3^{rd}$ of a BAND 3 of a storage device across the data structures and its eventual relocation to a new IU_$1^{st}$ in Target BAND T as the result of a defrag operation carried out by controller 124 in storage device 120. As shown in FIG. 2A, an L2P indirection table 115 (FIG. 1) is illustrated mapping multiple contiguous LBAs, e.g., LBA_1, LBA_2, LBA_3, LBA_4, . . . , LBA_N to a single IU using a logical address index 202 that is mapped to the IU-aligned physical address 204 of an IU, in this example, the third IU, IU_$3^{rd}$, of an example band, e.g. BAND 3.

As shown in FIG. 2B, an invalidity table 119 (FIG. 1) is illustrated, from which a level of invalidity of each band of storage in a storage device can be determined based on how many of the IUs in the band contain stale data. The status of the data is indicated by a binary status value of True for a valid status and False for and invalid status, i.e., stale data. In the illustrated example, the invalidity table contains values for bands, BAND 1 through BAND X, represented in the invalidity table with a band index 206, each band associated with multiple IU statuses 210 for each consecutive IU in the band, IU_$1^{st}$ Status through IU_Last Status.

By way of example only, it can be determined that, among the bands, BAND 1 through BAND X, included in the invalidity table 119, that BAND 3 208 has the greatest number of IUs at which the data is invalid, or stale, as evidenced by three False statuses and only one True status 212. The host 110 can determine, therefore, that BAND 3 is the band with the highest level of invalidity. The host 110 issues a defrag operation for BAND 3 to the host-managed storage device 120 using, for example, a command descriptor (see FIG. 3) that includes a defrag bitmap 117_1 as described next in FIG. 2C.

Figure 2C:
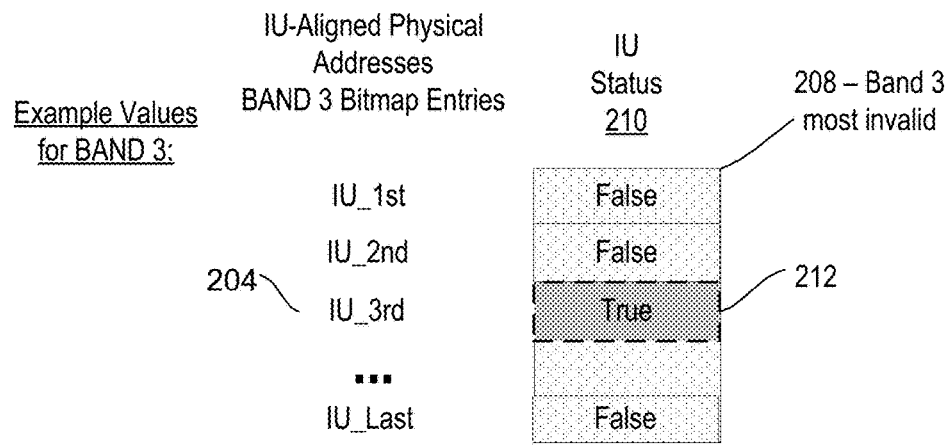

As shown in FIG. 2C, a defrag bitmap 117_1/117_2 (FIG. 1) is illustrated mapping the IU-aligned physical addresses 204 for a band, such as the exemplary BAND 3 (as found in the indirection table 115 in FIG. 2A), to a corresponding IU Status 210. Although only IU_$3^{rd}$ is shown in FIG. 2A, the indirection table 115 has a separate entry for each IU-aligned physical address in BAND 3, e.g., IU_$1^{st}$, IU_$2^{nd}$, IU_$3^{rd}$ etc. In one embodiment, the host 110 builds the defrag bitmap 117_1 for BAND 3 by creating a defrag bitmap entry for each of the IU-aligned physical addresses for BAND 3 and storing the corresponding status of False or True (as found in the corresponding BAND Index 206 and IU_$3^{rd}$ Status 210 element in the invalidity table 119). In the illustrated example of FIG. 2C, the IU statuses 210 for the most invalid BAND 3 208 include False status values for the defrag bitmap entries for the IU_$1^{st}$, IU_$2^{nd}$ and IU_Last IU-aligned physical addresses, and one True status value 212 for the defrag bitmap entry for the IU_$3^{rd}$ IU-aligned physical address 204.

In one embodiment, as the host CPU 110 continues to issue Write/Trim commands and Defrag operations to the storage device 120 and to update the invalidity table 119, the host CPU 110 also updates the corresponding status value of any affected IU-aligned physical addresses for BAND 3 in the defrag bitmap 117_1. In one embodiment, the status value is a binary value, such as True or False, which can be obtained using a function—Valid—having a location as its input argument:

Valid[previous/Source]=False

Valid[current/Target]=True where the previous/Source input argument of the function is an old location of stale data in a Source band, i.e., the band where the data was previously located, and a current/Target input argument is a new location of current data in a Target band, i.e., the band where data is relocated or newly located.

In one embodiment, the defrag bitmap 117_1 is made directly accessible to the host-managed storage device 120 by being stored in a PLI-safe data structure 125 within the device 120 as defrag bitmap 117_2. The PLI-safe data structure can be stored in a region of memory backed up by PLI energy, such as a DRAM or SRAM region, or in 3DXP media in a hybrid SSD 122. To keep the defrag bitmap 117_2 updated, the host CPU 110 specifies a "previous" physical address for each Write/Trim command and Defrag operation. In response, rather than relying on the host to provide the updated status value, the controller 124 of the storage device 120 internally computes the updated status value for the defrag bitmap 117_2 by invoking the above-described Valid function using the host-specified "previous" physical address/Source band supplied by the host, in which case the Valid function will return a False status value. In addition, the storage device 120 internally computes the updated status value for any new physical address/Target band to which data is relocated by the storage device 120, in which case the Valid function will return a True status value.

Valid[previous/Source]=False

Valid[current/Target]=True

In one embodiment, because the defrag bitmap 117_1, 117_2, only stores a binary status value as a single bit per each IU-aligned physical address to track the status of each IU in a given band, the memory footprint (in bits) of the defrag bitmap is determined by the SSD band physical capacity divided by the IU size. In a typical embodiment, this ratio results in a small memory footprint, approximately 0.0031% of a typical SSD capacity, or 3.1% of a typical L2P indirection table's 115 memory footprint. For example, if each SSD band is 1 GiB, and the IU size is 4 KiB, then the defrag bitmap 117_1, 117_2 for each group/band consumes only 32 KiB of additional storage over the existing host data structures for the L2P indirection table 115 and invalidity table 119. The small memory footprint makes the defrag bitmap 117_1, 117_2 capable of being stored directly in the storage device 120, making it useful as a means of performing the defrag operation directly on a per band basis in the storage device 120 independently of the host 110, thereby reducing the cost of the defrag operation.

Figure 2D:
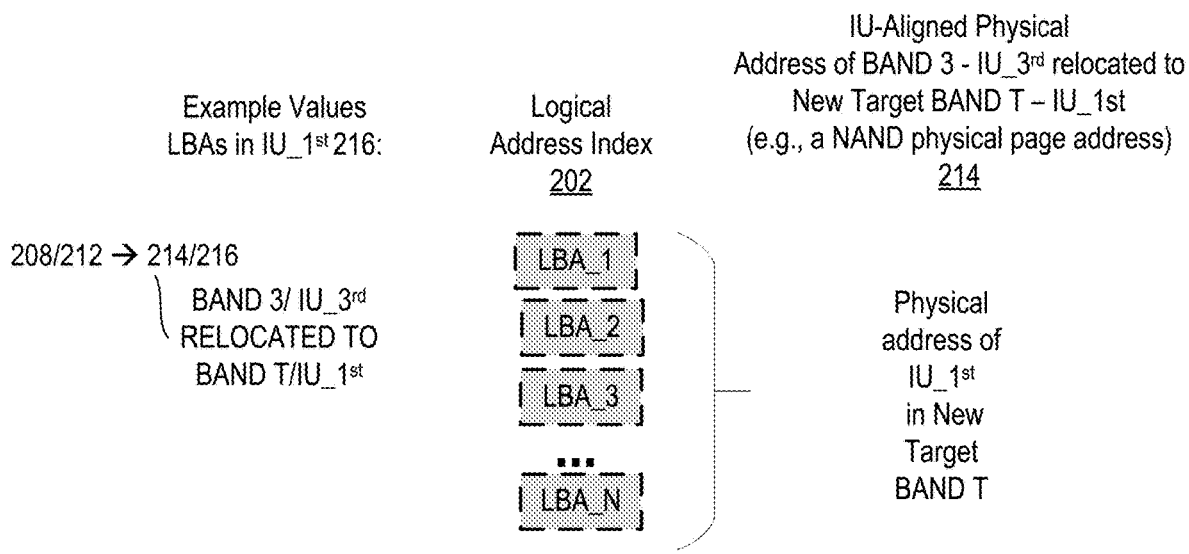

As shown in FIG. 2D, an L2P list 127 is a data structure that maps an LBA (using the logical address index) to a new target IU-aligned physical address after the defrag operation performed on a source band has been completed and the valid IUs relocated to a new target band. In this example, the source band being defragmented is BAND 3 (identified in FIG. 2B as the most invalid band). The third IU, $IU\_3^{rd}$ in BAND 3 (identified in FIG. 2C as the only IU in BAND 3 208 having the True/valid status 212) is shown in FIG. 2D as comprising N LBAs, LBA_1, LBA_2, LBA_3, . . . LBA_N, each LBA indexed in the L2P list 127 by the logical address index 202 and mapped to their new location, the first IU 216 at the IU-aligned physical address of Target BAND T 214. The L2P list 127 is generated internally by the SSD controller 124 and made available to the host CPU 110 after completion of a defrag operation so that the host can use the information to update the L2P indirection table 115 and invalidity table 119 with the latest addresses and values.

FIG. 3 illustrates an example defrag operation request as issued by a host CPU 110 using the format of a command descriptor 300 (also referenced in 114, FIG. 1). Once the host CPU 110 decides a defrag operation is needed, it will select the Source band and the Target band(s) for data relocation. In one embodiment, there can be more than one target band, or a maximum of two target bands, for the defrag operation because the first Target band may have already been written by previous host write or defrag operation and might not have enough space left to accommodate another band's relocatable IUs.

In one embodiment, the host will assemble a command descriptor (as shown in the table below), and send it to the SSD, e.g., via vendor unique command. The command descriptor 300 can be assembled by the host CPU 110 and transmitted to a storage device 120. A controller 124 of the storage device 120 processes the command descriptor 300, including determining at the very least which band is to be defragmented, i.e., the Source band, at least one Target location to which any valid IUs in the Source band can be relocated, e.g., the Target band(s), and how to determine which IUs in the Source band are valid, e.g., the defrag bitmap 117_1 of IU status values for the Source band.

For example, the command descriptor 300 can include a DWORD 302 formatted to contain, as illustrated, an SSD DRAM offset 304, a size 306 of the command payload (e.g., up to 65540 DWORDS), a Source band index, a number of Target bands 310, a Target BAND 1 index 312, a Target BAND 2 index, and a Target BAND 1 offset 316. Lastly, the DWORD 302 can contain a defrag bitmap 318, such as the above-described defrag bitmap 117_1 generated by the host CPU 110. As shown, an example size of the defrag bitmap 318 is determined from a ratio of the storage device's BAND physical capacity (e.g., 8 GiB) to the IU size (e.g. 4 KiB), which in this example results in a defrag bitmap of 256 KiB.

In one embodiment, when a host-managed storage device 120 receives command descriptor 300 from a host 110, the controller 124 of device 120 will commence defragmentation by relocating valid data from the Source band to the Target band, and assemble an L2P list 127 for all the relocated L2P indirection table 115 entries. The maximum number of elements in this list is the maximum number of IUs per band. Each element has two members, an L2P index and the NAND address. Once the defrag operation is complete, the controller 124 will send a completion message to the host 110 along with the L2P list 127, so that the host 110 can update its L2P indirection table 115 and defrag bitmap 117_1 as needed, and mark the Source band ready for erase.

Figure 4A:
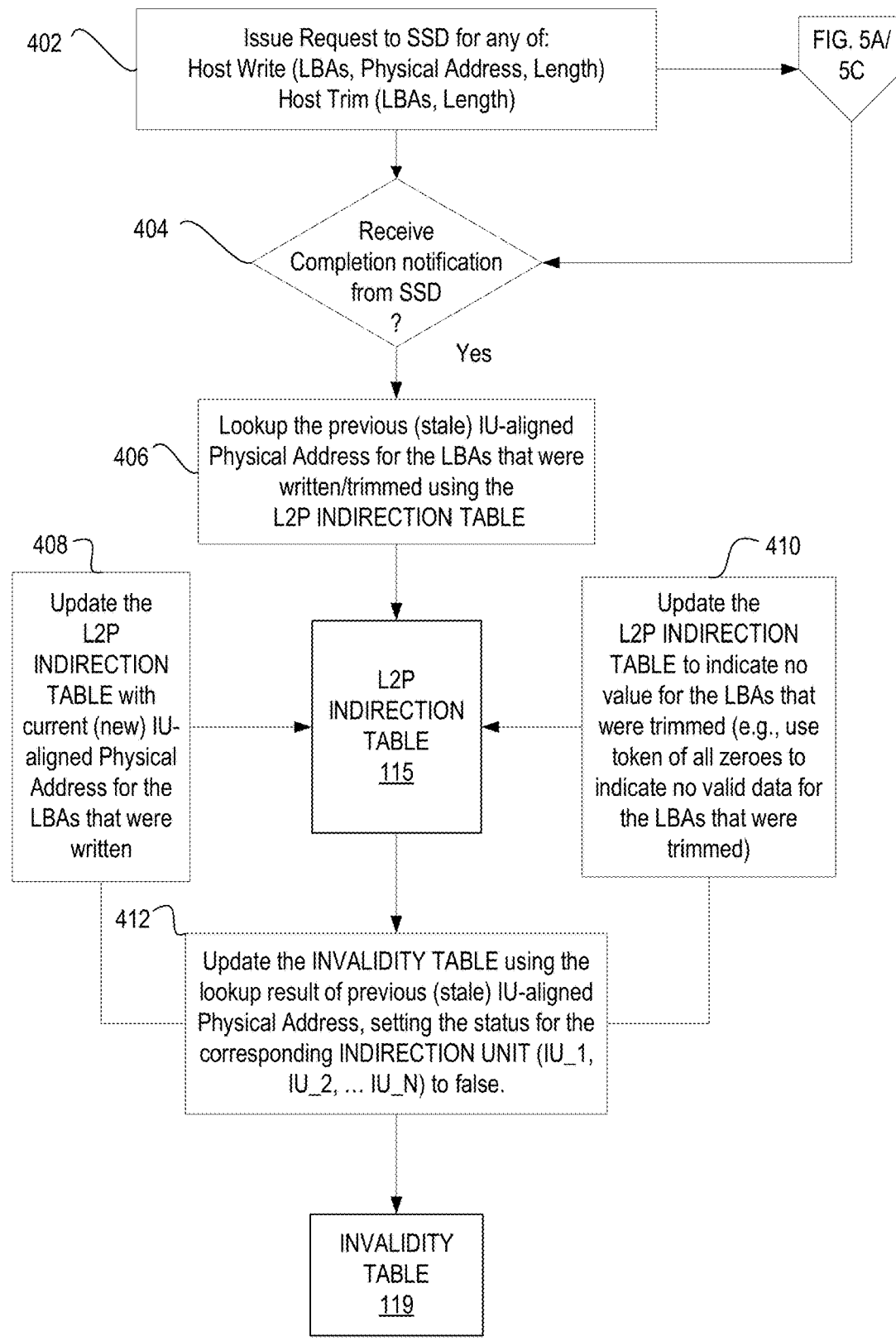
FIGS. 4A-4B illustrate an example first logic flow for the example system.
Figure 4B:
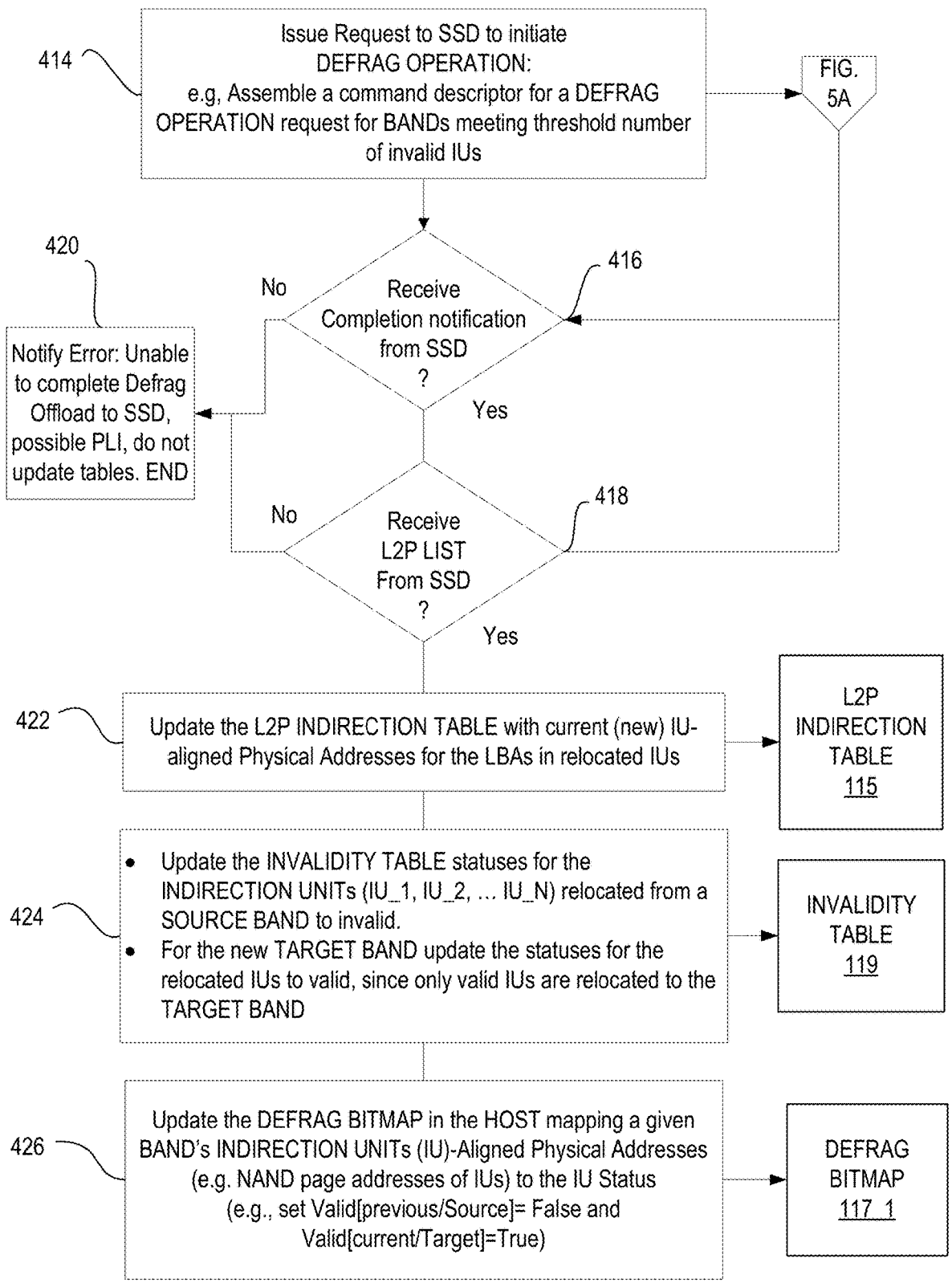

FIGS. 4A-4B illustrate example logic flows 400-401. A logic flow may be implemented in software, firmware, and/or hardware. In software and firmware embodiments, a logic flow may be implemented by computer executable instructions stored on at least one non-transitory computer-readable medium or machine-readable medium, such as an optical, magnetic or semiconductor storage. The embodiments are not limited in this context.

In the examples that follow, logic flows 400-401 may be representative of some or all the operations executed by one or more logic, features, or devices described herein, such as host 110 illustrated in detail with reference to FIG. 1 and elsewhere. More particularly, logic flows 400-401 may be implemented in software, firmware, and/or hardware.

In some examples, logic flows 400-401 may be performed in conjunction with elements of a host CPU such as host CPU 110 shown in FIG. 1 and a storage device such as storage device 120 shown in FIG. 1. For these examples, elements of memory or storage device 120 such as the host NVM 112 I/O interface 113/123, controller 124, NVM device(s) 122 and L2P indirection table 115, defrag bitmap 117_1 and invalidity table 119 as shown in FIG. 1 and FIGS. 2A-2D may be related to logic flows 400-401. Also, aspects of command descriptor 300 in FIG. 3 may be related to logic flows 400-401. However, example logic flows 400-401 are not limited to implementations using elements, schemes or codes as shown in FIGS. 1, 2A-2D and 3.

FIG. 4A illustrates an example host process 400 logic flow for a host Write/Trim commands as well as processes in preparation for offloading a defrag operation to a storage device 120. Beginning at block 402, a host issues a request to a host-managed storage device 120, such as an SSD, to perform a Host Write command, specifying one or more LBAs, Physical Address and Length, or a Host Trim, specifying one or more LBAs and Length. In one embodiment, the host specifies a Physical Address representing a previous Physical Address of the IU containing the specified LBAs so that the storage device 120 and controller 124 can internally maintain a defrag bitmap in preparation for subsequent defrag operations. After the host issues the request, control of the logic flow 400 is transferred to the storage device 120 as described in detail in FIGS. 5A/5C. Upon return of control to logic flow 400, at decision block 404 the host determines whether it received a completion notification from the storage device 120. If not, then the logic continues to await completion, but if so then the host at block 406 performs a lookup, using the L2P indirection table 115, of the previous (stale) IU-aligned Physical Address for the LBA that were written/trimmed. At block 408, the host updates the L2P indirection table 115 with the new current (new) IU-aligned Physical Address for the LBAs that were written as a result of the Host Write command. Likewise, at block 410, the host updates the L2P indirection table 115 to indicate no value for the LBAs that were trimmed. For example, the host can use a token of all zeroes to indicate that there is no valid data for the LBAs that were trimmed.

In one embodiment, after updating the L2P indirection table 115, the host at block 412 proceeds to update the invalidity table 119 using the lookup result of the previous (stale) IU-aligned Physical Address, and sets the status for the corresponding affected IUs to a false status, for example by invoking the Valid function with the previous (stale) address as the input argument.

Figure 5A:
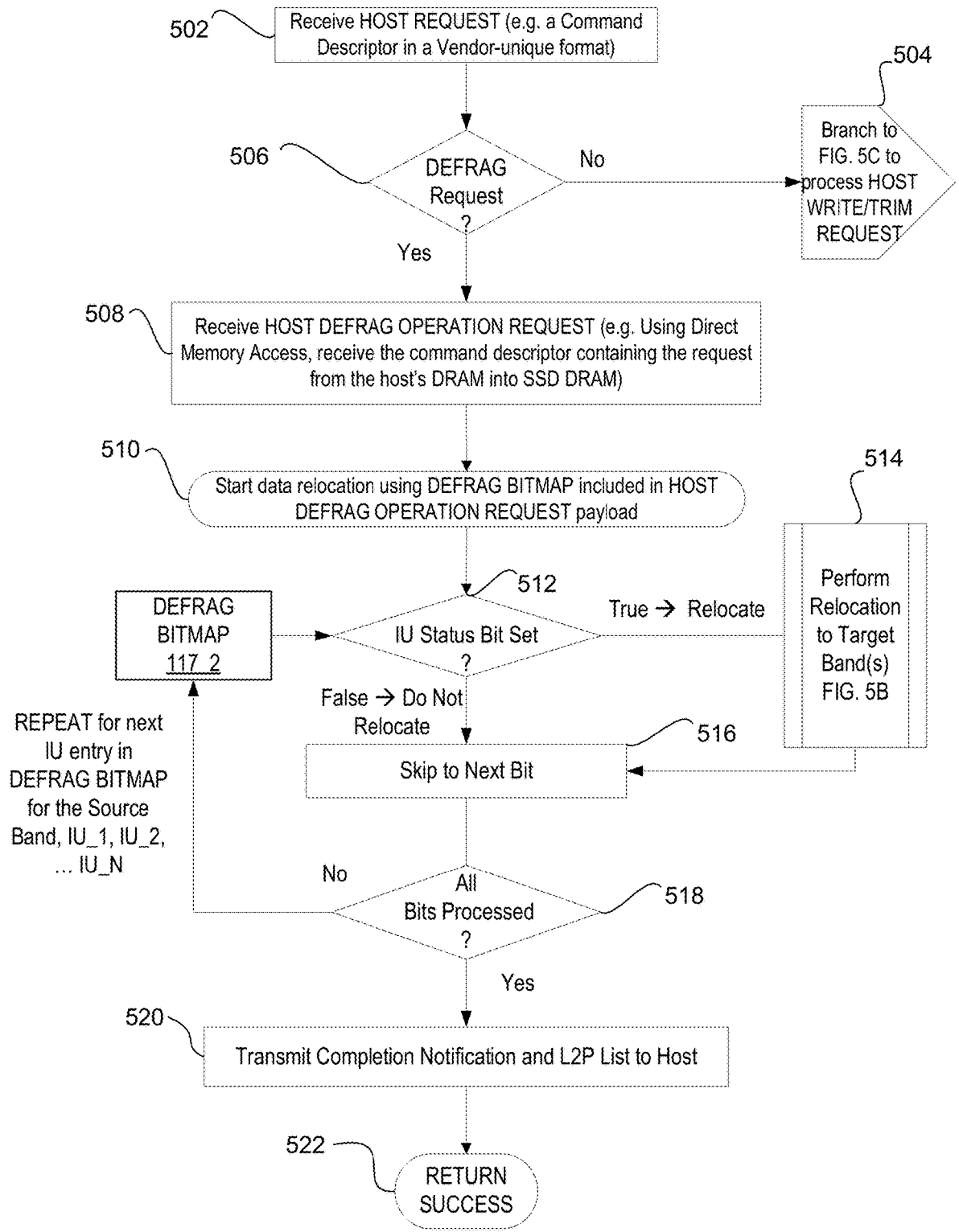
FIGS. 5A-5C illustrate an example second logic flow for the example system.

FIG. 4B illustrates an example host process logic flow 401 for offloading a defrag operation to a storage device 120. Beginning at block 414, the host 110 issues a request to a storage device 120, such as an SSD, to initiate a Defrag operation. For example, the host 110 assembles a command descriptor (300, FIG. 3) for a defrag operation for those bands meeting a threshold number of invalid IUs, i.e., having reached a level of invalidity that requires defragmentation for the host-managed device 120 to perform efficiently. Upon issuing the request, the logic flow 401 transfers control to the storage device 120 (FIG. 5A). Upon return of control to logic flow 401, at decision block 416, the host determines whether it received a completion notification from the storage device 120. If not, then an error is logged indicating that the host 110 was unable to complete the defrag operation, possibly due to a power loss interrupt, and terminates the logic flow 401 so that the host data structures L2P indirection table and invalidity table are not updated.

Logic flow 401 continues at decision block 418 to determine whether the host received an L2P list (127, FIG. 1 and FIG. 2D) from the storage device 120 upon completion of the defrag operation. If not, then an error is logged indicating that the host 110 was unable to complete the defrag operation, possibly due to a power loss interrupt, and terminates the logic flow 401 so that the host data structures L2P indirection table and invalidity table are not updated. If, however, the L2P list 127 was received, then at block 422 the logic flow 401 continues for the host to update the L2P indirection table 115 with the current (new) IU-aligned Physical Addresses for any LBAs in the relocated IUs.

At block 424, the logic flow 401 continues for the host to update the invalidity table 119 status for the IUs that were relocated from a Source band to an invalid status. At block 426, the logic flow 401 continues for the host to update the statuses of the IU-aligned Physical Addresses mapped in the corresponding band's defrag bitmap 117_1. For example, the host can update the statuses using the Valid function, setting a previous/Source address location to False and a current/Target address location to True.

Valid[previous/Source]=False

Valid[current/Target]=True

Figure 5B:
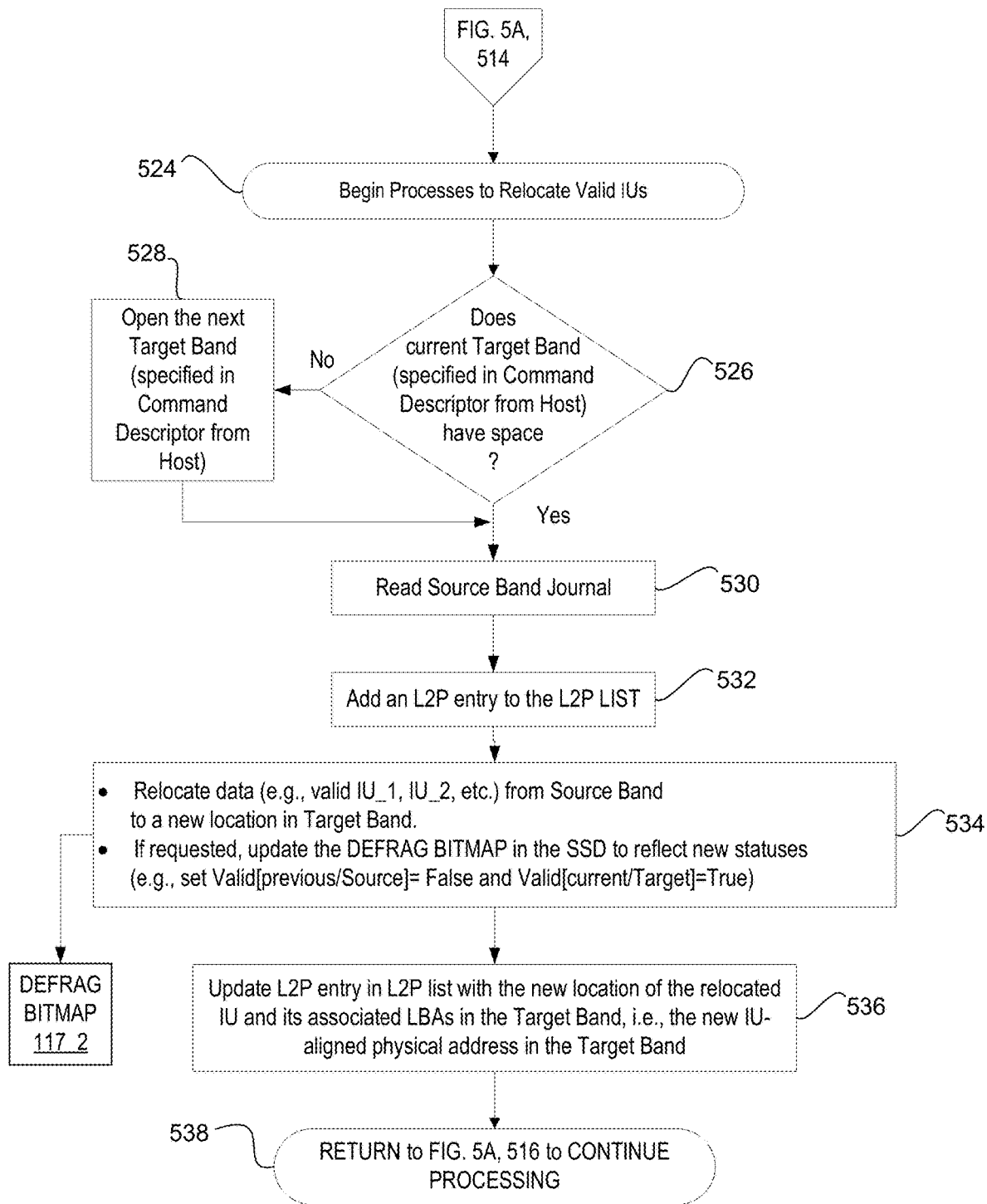
Figure 5C:
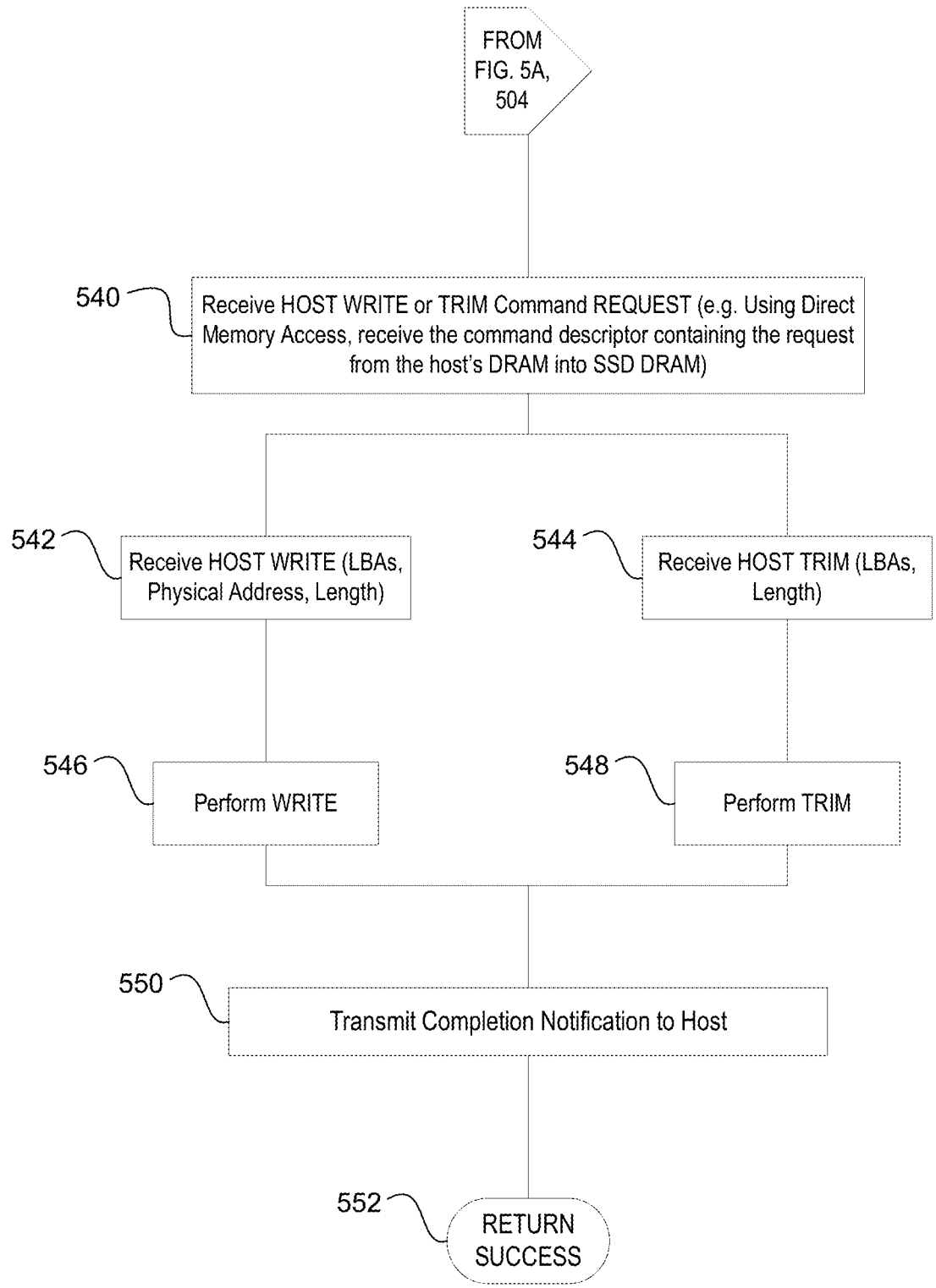

FIGS. 5A-5C illustrate example logic flow 500. A logic flow may be implemented in software, firmware, and/or hardware. In software and firmware embodiments, a logic flow may be implemented by computer executable instructions stored on at least one non-transitory computer-readable medium or machine-readable medium, such as an optical, magnetic or semiconductor storage. The embodiments are not limited in this context.

In the examples that follow, logic flow 500 may be representative of some or all the operations executed by one or more logic, features, or devices described herein, such as storage device 120 and controller 124 illustrated in detail with reference to FIG. 1 and elsewhere. More particularly, logic flow 500 may be implemented in software, firmware, and/or hardware.

In some examples, logic flow 500 may be performed in conjunction with elements of a host CPU such as host CPU 110 shown in FIG. 1 as well as storage device 120 shown in FIG. 1. For these examples, elements of memory or storage device 120 such as the host NVM 112, I/O interface 113/123, controller 124, NVM device(s) 122 and L2P indirection table 115, defrag bitmap 117_1 and invalidity table 119 as shown in FIG. 1 and FIGS. 2A-2D may be related to logic flow 500. Also, aspects of command descriptor 300 in FIG. 3 may be related to logic flow 500. However, example logic flow 500 is not limited to implementations using elements, schemes or codes as shown in FIGS. 1, 2A-2D and 3.

Beginning at block 502, a storage device 120 receives a host request, such as a request formatted as a command descriptor in a vendor-unique format (e.g. 300 in FIG. 3). At decision block 506, the storage device controller 124 determines whether the request is a defrag operation requesting defragmentation of a specified band of storage in storage device 120. If not, then control of logic flow 500 branches at 504 to FIG. 5C to process any host write or trim request. If, however, the request is a defrag request, then at block 508, the logic flow 500 causes the controller 124 to receive the command descriptor containing the request from the host's DRAM (e.g., host NVM 112) into the storage device DRAM (e.g. into SSD NVM 122 and/or a PLI-safe data structure 125 for containing the defrag bitmap 117_2).

Continuing at block 510, the logic flow 500 commences a logic flow loop to start data relocation using the defrag bitmap 117_1 included in the host's defrag operation request command descriptor payload of, if already present, the defrag bitmap 117_2 stored in the storage device's NVM 122/125. At decision block 512, the controller 124 of storage device 120 determines the Source band specified in the request and whether an IU status bit for the IU in the band to be relocated is valid (True) or invalid (False). If True, then logic flow 500 branches to FIG. 5B to perform the relocation to a host-specified Target band contained in the request. If False, then logic flow 500 continues at 516 to skip to the next bit of the defrag bitmap since only valid IUs are relocated.

The logic flow 500 continues looping through the bits of the defrag bitmap until, at decision block 518, the controller 124 determines that all bits have been processed. At block 520, the controller 124 of storage device 120 proceeds to transmit to the requesting host CPU 110 a completion notification and an L2P List (generated during the relocation, FIG. 5B) of relocated IUs and at 522 returns control successfully to the requesting host.

With reference to FIG. 5B, the logic flow 500 receives control from FIG. 5A, block 514 and, at 524, begins processes to relocate IUs having a valid status. At decision block 526 and 528, the controller 124 of storage device 120 first determines whether any of the Target band(s) specified by the host in the defrag request have available space until a good Target is found. At block 530, the logic flow 500 continues and the controller 124 proceeds to read the Source band journal. At block 532, the controller 124 proceeds to add an L2P entry to the L2P List, and at block 534, the controller 124 relocates the valid data from the Source band to a new location in the specified Target band. If requested, the controller 124 also updates the defrag bitmap 117_2 stored locally in the NVM 122/125 to reflect the new statuses. For example, the controller 124 internally sets the status for the IUs at the previous/Source band locations to False and sets the status for the IUs at the new Target band locations to True.

At block 536, the logic flow 500 continues with the controller 124 of storage device 120 generating an updated L2P entry in the L2P list with a new location of the relocated IU and its associated LBAs in the Target band, i.e., the new IU-aligned physical address in the Target band. At block 538, the logic flow 500 returns control to FIG. 5A, block 516 to continue processing.

With reference to FIG. 5C, the logic flow 500 receives control from FIG. 5A, block 504 and, at 540, begins processes to receive a host Write or Trim command. For example, the controller 124 of storage device 120 can received the command descriptor containing the request from the hosts DRAM into the storage device DRAM. At block 542 the logic flow 500 receives the host Write command, including the host-specified LBAs, Physical Address and Length of the data to be written. At block 542 the logic flow 500 receives the host Trim command, including the host-specified LBAs and length of the data to be trimmed. After performing the respective Write command at 546 and Trim command at 548, the logic flow 500 continues at block 550 to transmit a completion notification to the host 110, and at termination block 552, the logic flow 500 concludes and returns control to the host 110.

In one embodiment, the host 110 specifies the previous/Source band location for the data being written or trimmed. When provided with this information, the controller 124 can invoke the Valid function to update the local copy of the defrag bitmap 117_2 to update the status of the defrag bitmap entries for the IUs that are affected by the Write and Trim commands to an invalid status.

According to some examples, logic and/or features of controller 124 may impose granularity and size restrictions on data for the number of N LBAs in the IUs and the size of a band, thereby reducing an amount of space needed for any defrag bitmap entries stored in the storage device 120 and associated NVM 122 and PLI-safe data structures 125. For example, a defrag bitmap may be limited to support a maximum of 256 KiB memory footprint. In some examples, memory 122 or storage device 120 may be configured to support only smaller defrag bitmaps with, for example, a 32 KiB memory footprint for less granular IUs (e.g., IUs with a fewer number N of LBAs per IU) or a smaller maximum band size (e.g., 1 GiB instead of 8 GiB).

Figure 6A:
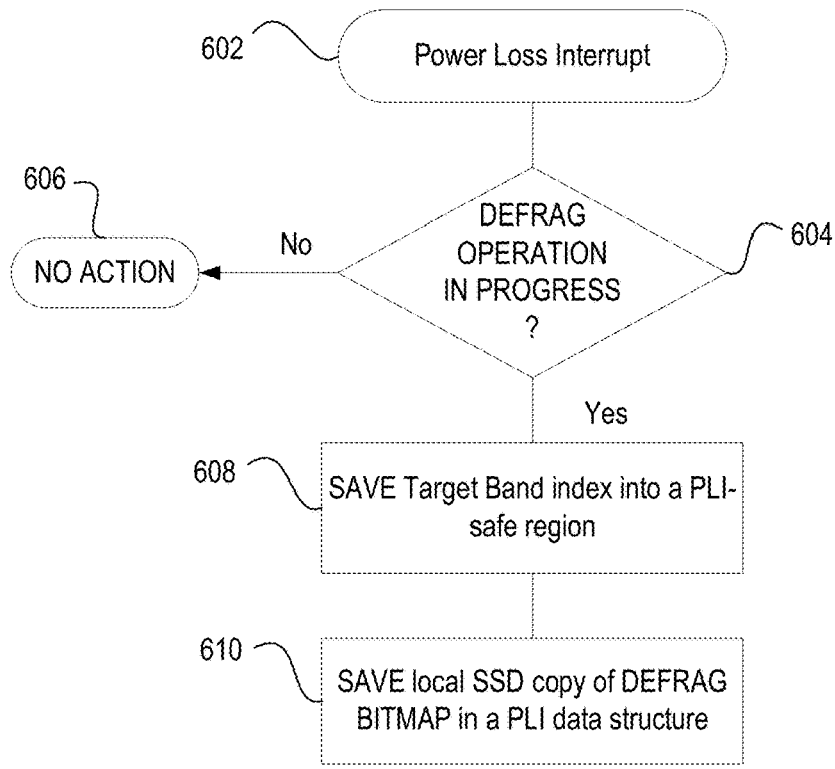
FIGS. 6A-6B illustrate an example fourth logic flow for the example system.
Figure 6B:
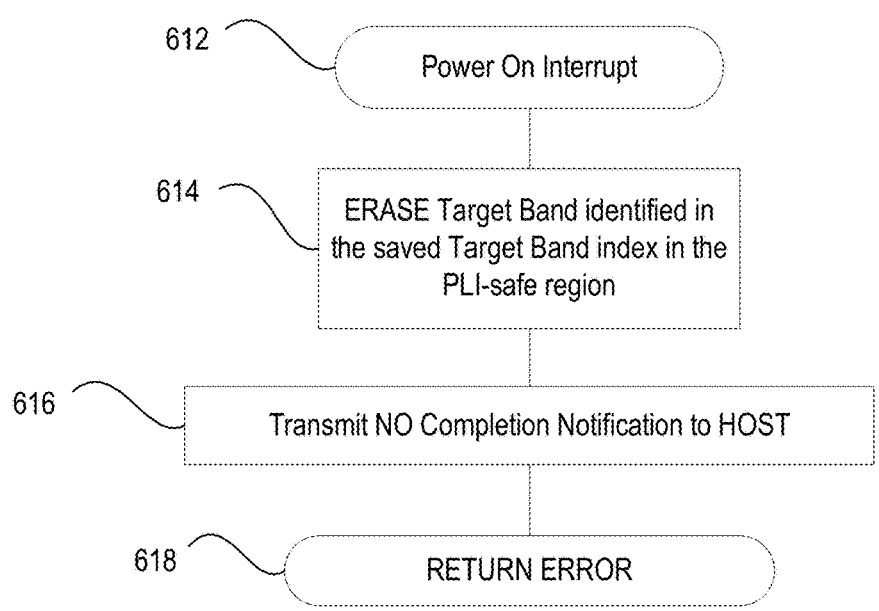

FIGS. 6A-6B illustrate an example logic flow 600 for a power-loss-interrupt (PLI) process for an offloaded defrag operation in a host-managed system 100. According to some examples, logic and/or features of controller 124 at memory or storage device 120 may implement the PLI logic flow 600, as modified to support an offloaded defrag operation, responsive to memory device failure due to power loss or other operational failure. With reference to FIG. 6A, the PLI logic flow is initiated when logic and/or features of controller 124 capable of conducting a defrag operation receives a power loss interrupt 602 while monitoring for a power loss.

In one embodiment, at decision block 604, the logic flow 600 determines whether there is a defrag operation in progress that is not yet complete. If not, then no action 606 is taken. If so, then at block 608, the logic flow 600 saves the Target band index into which the Source band is being defragmented in a PLI-safe region 125. At block 610, the logic flow 600 further saves a local storage device copy of the defrag bitmap 117_2 in to PLI data structure of the PLI-safe region 125. With reference to FIG. 6B, if the power on interrupt 612 is detected indicating that the power to the host-managed storage device 120 has been restored, then at block 614, the controller 124 erases the Target band identified in the saved Target band index in the PLI-safe region. This ensures that any partially defragmented portions of the Target band are not used, leaving it to the host to determine whether to retry the defrag operation for the Source band later. To conclude, the logic flow 600 transmits a NO Completion notification to the host 110, and at termination block 618 returns an error status.

Figure 7:
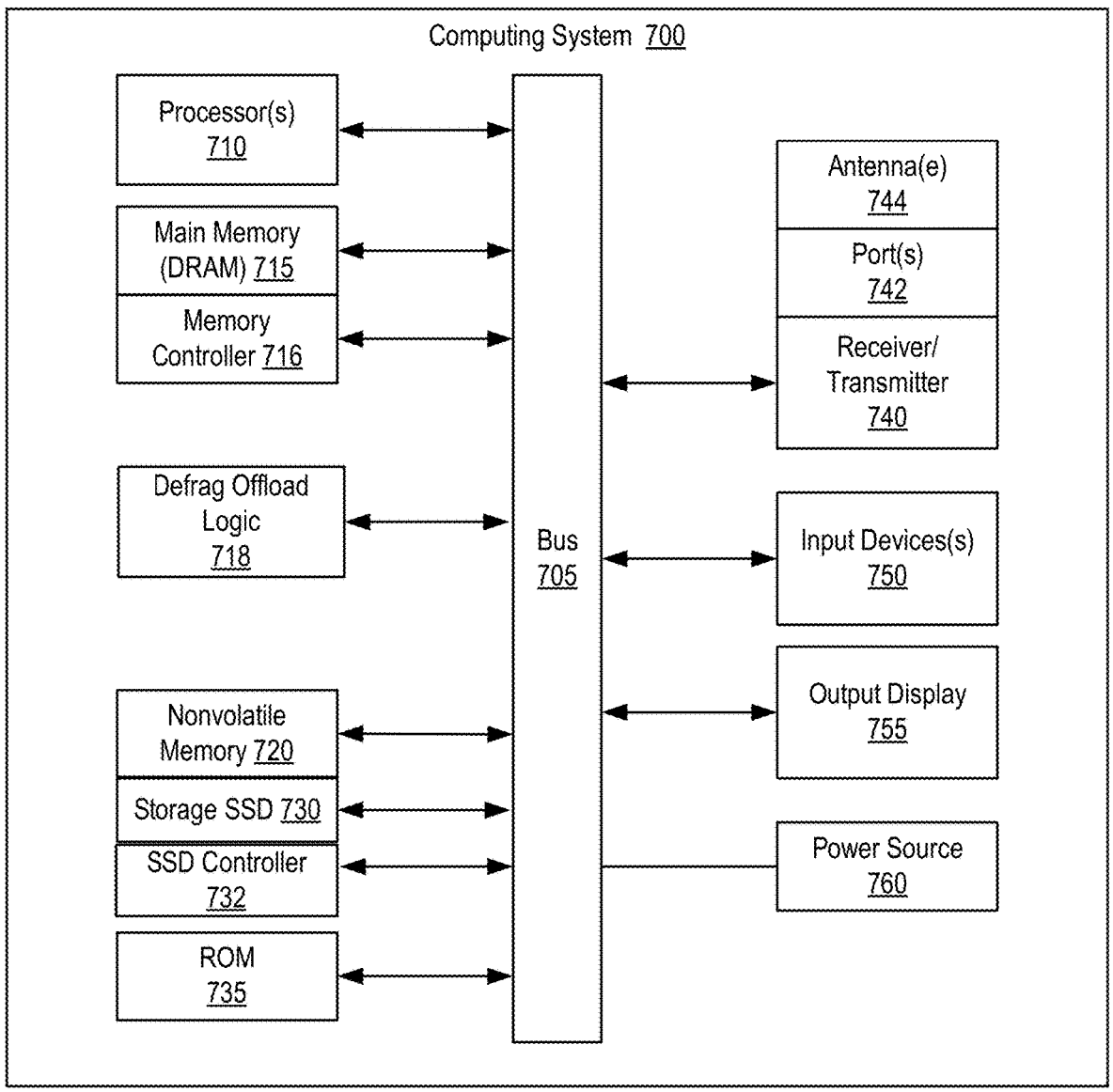
FIG. 7 illustrates a general computer system in which the example system can be implemented.

FIG. 7 is an illustration of a system in which dynamic reliability levels for non-volatile memory can be implemented according to an embodiment. In this illustration, certain standard and well-known components that are not germane to the present description are not shown. Elements shown as separate elements may be combined, including, for example, a SoC (System on Chip) combining multiple elements on a single chip.

In some embodiments, a computing system 700 may include a processing means such as one or more processors 710 coupled to one or more buses or interconnects, shown in general as bus 705. The processors 710 may comprise one or more physical processors and one or more logical processors. In some embodiments, the processors may include one or more general-purpose processors or special-purpose processors.

The bus 705 is a communication means for transmission of data. The bus 705 is illustrated as a single bus for simplicity but may represent multiple different interconnects or buses and the component connections to such interconnects or buses may vary. The bus 705 shown in FIG. 7 is an abstraction that represents any one or more separate physical buses, point-to-point connections, or both connected by appropriate bridges, adapters, or controllers.

In some embodiments, the computing system 700 further comprises a random access memory (RAM) or other dynamic storage device or element as a main memory 715 and memory controller 716 for storing information and instructions to be executed by the processors 710. Main memory 715 may include, but is not limited to, dynamic random access memory (DRAM). In one embodiment, the RAM or other dynamic storage device or element includes logic 718 to support offloading defragmentation from a host to a storage device, where the logic 718 includes logic performed in any of a host and a storage device as described herein.

The computing system 700 also may comprise a non-volatile memory 720 of a storage device such as a solid-state drive (SSD) 730, including a hybrid SSD, an SSD Controller 732, and a read only memory (ROM) 735 or other static storage device for storing static information and instructions for the processors 710.

In some embodiments, the computing system 700 includes one or more transmitters or receivers 740 coupled to the bus 705. In some embodiments, the computing system 700 may include one or more antennae 744, such as dipole or monopole antennae, for the transmission and reception of data via wireless communication using a wireless transmitter, receiver, or both, and one or more ports 742 for the transmission and reception of data via wired communications. Wireless communication includes, but is not limited to, Wi-Fi, Bluetooth™, near field communication, and other wireless communication standards.

In some embodiments, computing system 700 includes one or more input devices 750 for the input of data, including hard and soft buttons, a joystick, a mouse or other pointing device, a keyboard, voice command system, or gesture recognition system.

In some embodiments, computing system 700 includes an output display 755, where the output display 755 may include a liquid crystal display (LCD) or any other display technology, for displaying information or content to a user. In some environments, the output display 755 may include a touch-screen that is also utilized as at least a part of an input device 750. Output display 755 may further include audio output, including one or more speakers, audio output jacks, or other audio, and other output to the user.

The computing system 700 may also comprise a battery or other power source 760, which may include a solar cell, a fuel cell, a charged capacitor, near field inductive coupling, or other system or device for providing or generating power in the computing system 700. The power provided by the power source 760 may be distributed as required to elements of the computing system 700.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 715 or the non-volatile memory 720 or a combination of such memories, and each of these memories is a form of a machine-readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

One or more aspects of at least one example in the foregoing descriptions may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine-readable medium and supplied to various customers or manufacturing facilities to load into the fabrication machines that make the logic or processor. The techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus, processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer-readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Additional example implementations are as follows:

An example method, system, apparatus or computer-readable medium can be implemented in a platform and a logic to enable a host to offload all or a portion of a defrag operation to a memory or storage device such as an SSD, including determining the valid sectors/blocks to relocate without requiring data transfers from/to the host.

In another example implementation, a memory device circuitry is an apparatus that includes a controller to control an NVM, a memory to store a mapping of a physical address of a contiguous block of memory within a source band of the NVM to a status of data contained in the contiguous block of memory, the status one of a valid status and an invalid status. The controller is to defragment the source band to a target band separate from the source band based on the mapping, including to relocate data having the valid status from the contiguous block of memory within the source band to another contiguous block of memory within the target band.

In another example implementation, the contiguous block of memory is one of a plurality of units of contiguous logical block addresses (LBAs) within the source band and the mapping is a bitmap stored in a region of the memory protected from a power-loss-interrupt (PLI), an entry of the bitmap corresponding to one of the plurality of units of contiguous LBAs within the source band.

In another example implementation, the source band and target band each comprise a band of physical pages in the NVM, and each unit of the plurality of units of contiguous LBAs is an indirection unit (IU) aligned at a physical address of a physical page in the band of physical pages in the NVM. In addition, each entry of the bitmap corresponds to the physical address at which an IU is aligned, an entry to indicate a status of the data contained in the IU, the status any one of the valid status and the invalid status.

In another example implementation, to defragment the source band to the target band based on the mapping, the controller is to determine the status of data contained in an IU aligned at a source physical address based on the entry of the bitmap corresponding to the source physical address, relocate the data determined to have the valid status to an IU aligned to a target physical address, and update the entry of the bitmap corresponding to the source physical address to an invalid status.

In another example implementation, the controller is to defragment the source band responsive to a command received from the host to defragment the source band. The command is to specify the source band and any one or more of an available target band and the bitmap, including the bitmap stored in a context safe region of memory in the host.

In another example implementation, the controller is further to notify the host that the command to defragment the source band is complete, generate a list mapping a logical address index of the plurality of units of contiguous LBAs in the IU with the target physical address to which the data in the IU was relocated, and provide the list to the host.

In another example implementation, the source band specified in the command received from the host is based on an indirection table to map the logical address index of an LBA to the physical address at which the IU containing the LBA is aligned, the logical address index representing a logical block address in the NVM. In addition, the source band specified in the command is based on an invalidity table to track a level of invalidity of the source band, the level of invalidity based on how many IUs are aligned with source physical addresses mapped to the invalid status as compared to the valid status. In addition, the source band specified in the command is based on the host having determined that the level of invalidity of the source band triggered the request to defragment the source band.

In another example implementation, the list enables the host to update the indirection table with the target physical address to which the data in the IU was relocated.

In another example implementation, the command received from the host is a command descriptor to include any of an offset to a region of memory accessible to both the controller and the host, a size of the command, an index of the source band to be defragmented, an index of the target band where the data is to be relocated, and an offset to the index of the target band.

In another example implementation, the command descriptor received from the host is stored in the region of memory accessible to both the controller and the host via direct memory access (DMA).

In another example implementation, the NVM is arranged in any of a solid-state storage device (SSD) and a hybrid SSD.

In another example implementation, the controller is further to store an index to the target band in a power-loss-interrupt (PLI) safe region of the NVM, erase any data relocated to the target band upon detecting a PLI, and notify the host that the command to defragment the source band is not complete.

In another example implementation, the PLI safe region of the NVM includes any of a DRAM region, an SRAM region and a three-dimensional cross-point media, the controller further to store the mapping in the PLI safe region of the memory.

In another example implementation, a storage system is an apparatus that comprises non-volatile media and logic coupled to the non-volatile media to perform a method, including to receive a request from a host managing the non-volatile media to defragment a band of contiguous data in the non-volatile media from a source band to a target band separate from the source band, and defragment the source band to the target band based on a status of data within the source band, the status one of a valid status and an invalid status tracked for data located at physical addresses within the band of contiguous data.

In another example implementation, the logic coupled to the non-volatile media is further to perform a method to notify the host that the request to defragment the source band is complete, generate a list mapping logical address indices of contiguous logical block addresses of the band of contiguous data with physical addresses in the target band to which the source band was defragmented, and provide the list to the host.

In another example implementation, the storage system further includes a map to track the status of data located at the physical addresses within the band of contiguous data, wherein the map is maintained in any of a protected region of memory coupled to the host managing the non-volatile media, a region of a memory coupled to the non-volatile media, and specified in the request, and wherein the map is updated to invalidate the status of data relocated from the physical addresses within the band of contiguous data responsive to the request.

In another example implementation, the region of memory coupled to the non-volatile media is protected from a power-loss-interrupt (PLI).

In another example implementation, the map to track the status of data located at physical addresses within the band is a bitmap, each entry of the bitmap to correspond to a unit of contiguous logical block addresses aligned at one of the physical addresses within the band, and further where each entry of the bitmap is to store any one of a true value for the valid status and a false value for the invalid status.

In another example implementation, the unit of contiguous logical block addresses aligned at one of the physical addresses within the band is an indirection unit (IU).

In another example implementation, the request from the host is to specify the source band to be defragmented and one or more target bands into which the source band is to be defragmented.

In another example implementation, at article of manufacture in the form of at least one machine-readable medium comprises a plurality of instructions executable by a system to cause the system to defragment a band of contiguous data in a non-volatile media from a source band to a target band separate from the source band responsive to a request from a host managing the non-volatile media, wherein the source band is defragmented to the target band based on a status of data within the source band, the status one of a valid status and an invalid status tracked for data located at physical addresses within the band of contiguous data.

In another example implementation, the plurality of instructions further cause the system to notify the host that the request to defragment the source band is complete, generate a list mapping logical address indices of contiguous logical block addresses of the band of contiguous data with physical addresses in the target band to which the source band was defragmented, and provide the list to the host.

In another example implementation, the plurality of instructions further cause the system to track the status of data located at the physical addresses within the band of contiguous data in a map, the map specified in the request, and further cause the system to maintain the map in any of a protected region of memory coupled to the host managing the non-volatile media, a region of a memory coupled to the non-volatile media, and further cause the system to update the map to invalidate the status of data relocated from the physical addresses within the band of contiguous data responsive to the request.

In another example implementation, the region of memory coupled to the non-volatile media is protected from a power-loss-interrupt (PLI).

In another example implementation, the map to track the status of data located at physical addresses within the band is a bitmap, and each entry of the bitmap is to correspond to a unit of contiguous logical block addresses aligned at one of the physical addresses within the band and store any one of a true value for the valid status and a false value for the invalid status.

In another example implementation, the unit of contiguous logical block addresses aligned at one of the physical addresses within the band is an indirection unit (IU) comprising a plurality of logical block addresses maintained in the host in a logical to physical indirection table.

In the foregoing specification, embodiments have been described with reference to specific exemplary embodiments. It will be evident that various modifications could be made to the described embodiments without departing from the broader spirit and scope of the embodiments as set forth in the following claims. The specification and drawings are, accordingly, to be regarded in an illustrative sense rather than a restrictive sense.

What is claimed is:

1. A memory device, comprising:
a non-volatile memory ("NVM") that includes bands of physical pages, the bands of physical pages to include a source band and a target band separate from the source band; and
circuitry coupled to the NVM to:
receive a request to defragment a band of contiguous data in the NVM from the source band to the target band based on a status of data within the source band, the status of data to include one of a valid status and an invalid status for data located at physical addresses within the band of contiguous data,
notify the requester that the request to defragment the source band is complete,
generate a list associating logical address indices of contiguous logical block addresses of the band of contiguous data with physical addresses in the target band to which the source band was defragmented, and provide the list to the requester.

2. A memory device as in claim 1, wherein the requester is to specify the source band to be defragmented and one or more target bands into which the source band is to be defragmented.

3. A memory device as in claim 1, further comprising:
a map to track the status of data located at the physical addresses within the band of contiguous data, wherein the map is:
specified in the request,
maintained in a protected region of memory, and
updated to invalidate the status of data relocated from the physical addresses within the band of contiguous data responsive to the request.

4. A memory device as in claim 3, wherein the protected region of memory is coupled to any of:
the requester and the NVM; and
wherein the protected region of memory is protected from a power-loss-interrupt (PLI) event.

5. A memory device as in claim 3, wherein the map is a bitmap, each entry of the bitmap to:
correspond to a unit of contiguous logical block addresses aligned at one of the physical addresses within the band of contiguous data in the NVM; and
store any one of a true value for the valid status and a false value for the invalid status.

6. A memory device as in claim 5, wherein the unit of contiguous logical block addresses aligned at one of the physical addresses within the band of contiguous data is an indirection unit (IU).

7. A method, comprising:
in a processor coupled to a non-volatile media (NVM) including bands of physical pages, the bands of physical pages including a source band and a target band separate from the source band:
generating a request to defragment a band of contiguous data in the NVM from the source band to the target band;
transmitting the request to the NVM;
receiving from the NVM a notification that the request to defragment the band is complete, the source band having been defragmented to the target band based on a status of data within the source band, the status of data to include one of a valid status and an invalid status for data located at physical addresses within the band of contiguous data; and
receiving from the NVM a list associating logical address indices of contiguous logical block addresses of the band of contiguous data with physical addresses in the target band to which the source band was defragmented.

8. A method as in claim 7, further comprising specifying in the request the source band to be defragmented and one or more target bands into which the source band is to be defragmented.

9. A method as in claim 7, further comprising:
generating a map to track the status of data located at the physical addresses within the band of contiguous data;
specifying the map in the request; and
maintaining the map in a protected region of memory coupled to any of the processor and the NVM, the protected region of memory protected from a power-loss-interrupt (PLI) event.

10. A method as in claim 9, wherein maintaining the map includes updating, responsive to the request, the map to invalidate the status of data relocated from the physical addresses within the band of contiguous data.

11. A method as in claim 9, wherein the map is a bitmap, each entry of the bitmap:
corresponding to a unit of contiguous logical block addresses aligned at one of the physical addresses within the band of contiguous data in the NVM; and
storing any one of a true value for the valid status and a false value for the invalid status.

12. A method as in claim 11, wherein the unit of contiguous logical block addresses aligned at one of the physical addresses within the band of contiguous data is an indirection unit (IU).

13. At least one non-transitory machine-readable medium comprising a plurality of instructions executable by a system to cause the system to:
generate a request to defragment a band of contiguous data in a non-volatile media (NVM) coupled to the system, the NVM to include bands of physical pages, the request to defragment the band from a source band in the bands of physical pages to a target band separate from the source band;
transmit the request to the NVM;
receive from the NVM a notification that the request to defragment the band is complete, the source band having been defragmented to the target band based on a status of data within the source band, the status of data to include one of a valid status and an invalid status for data located at physical addresses within the band of contiguous data; and
receive from the NVM a list associating logical address indices of contiguous logical block addresses of the band of contiguous data with physical addresses in the target band to which the source band was defragmented.

14. The at least one non-transitory machine-readable medium of claim 13, wherein the plurality of instructions further cause the system to specify in the request the source band to be defragmented and one or more target bands into which the source band is to be defragmented.

15. The at least one non-transitory machine-readable medium of claim 13, wherein the plurality of instructions further cause the system to:
generate a map to track the status of data located at the physical addresses within the band of contiguous data;
specify the map in the request; and
maintain the map in a protected region of memory coupled to any of the system and the NVM, the protected region of memory protected from a power-loss-interrupt (PLI) event.

16. The at least one non-transitory machine-readable medium of claim 15, wherein to maintain the map, the plurality of instructions further cause the system, responsive to the request, to update the map to invalidate the status of data relocated from the physical addresses within the band of contiguous data.

17. The at least one non-transitory machine-readable medium of claim 15, wherein the map is a bitmap, each entry of the bitmap to:
correspond to a unit of contiguous logical block addresses aligned at one of the physical addresses within the band of contiguous data in the NVM; and
store any one of a true value for the valid status and a false value for the invalid status.

18. The at least one non-transitory machine-readable medium of claim 17, wherein the unit of contiguous logical block addresses aligned at one of the physical addresses within the band of contiguous data is an indirection unit (IU).

* * * * *